United States Patent [19]

Shaw et al.

[11] 4,117,579

[45] Oct. 3, 1978

[54] METHOD OF IMPREGNATING A CAPACITOR

[75] Inventors: David G. Shaw, Glens Falls; Vandos Shedigian, Hudson Falls, both of N.Y.

[73] Assignee: General Electric Company, Hudson Falls, N.Y.

[21] Appl. No.: 817,145

[22] Filed: Jul. 20, 1977

Related U.S. Application Data

[63] Continuation of Ser. No. 691,886, Jun. 1, 1976, abandoned, which is a continuation-in-part of Ser. No. 597,694, Jul. 21, 1975, abandoned, which is a continuation-in-part of Ser. No. 403,787, Oct. 5, 1973, abandoned.

[51] Int. Cl.$^2$ .............................................. H01G 4/22
[52] U.S. Cl. .................................. 29/25.42; 361/319; 427/81
[58] Field of Search ..................... 29/25.42; 427/81; 361/314, 319

[56] References Cited

U.S. PATENT DOCUMENTS

| T889,010 | 8/1971 | Tapley | 361/319 |
| 2,084,472 | 6/1937 | Wiezevich | 361/319 |
| 3,833,978 | 9/1974 | Eustance | 361/315 X |

FOREIGN PATENT DOCUMENTS 2,047,398  3/1971  France .................................. 361/319

Primary Examiner—E. A. Goldberg
Attorney, Agent, or Firm—James J. Lichiello

[57] ABSTRACT

Between about 0.01 and 10.0% by weight of an antioxidant, and between about 0.1 and 10% by weight of an epoxide are added to a liquid aromatic ester prior to refining or purification of the ester and prior to the use of the ester to impregnate a capacitor.

6 Claims, 6 Drawing Figures

U.S. Patent  Oct. 3, 1978  4,117,579
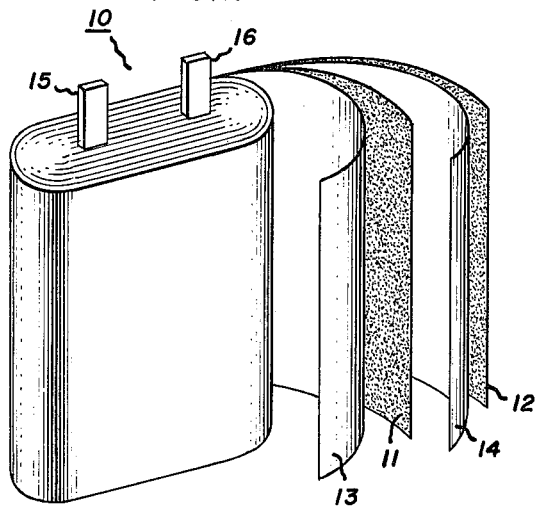
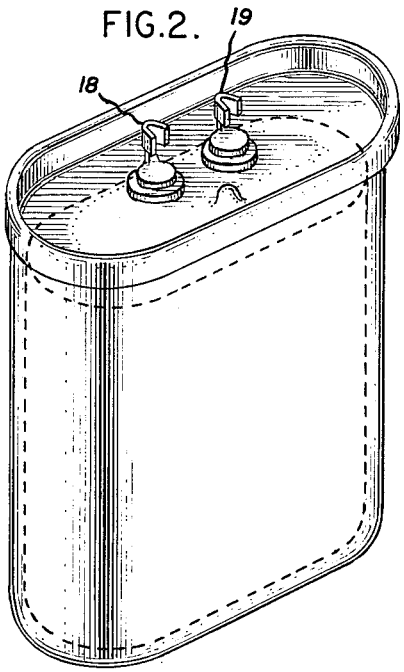
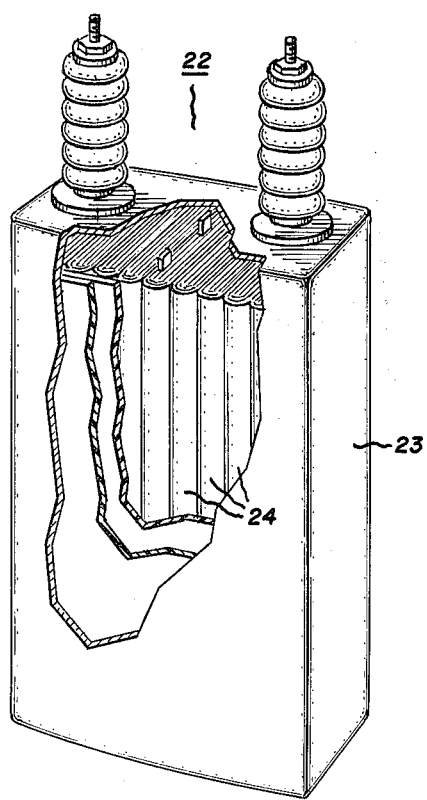
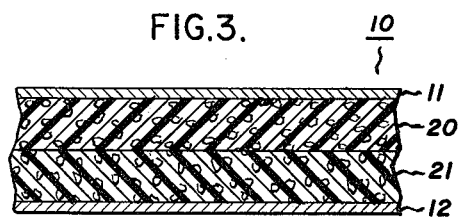
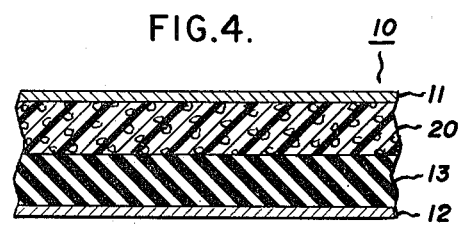
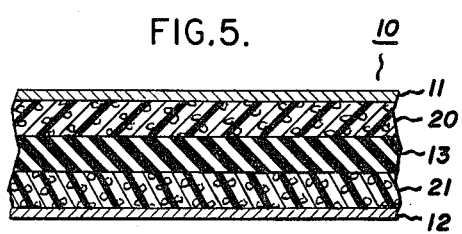

METHOD OF IMPREGNATING A CAPACITOR

BACKGROUND OF THE INVENTION

This is a continuation of application Ser. No. 691,886, filed June 1, 1976 now abandoned which was a continuation-in-part application of copending application Ser. No. 597,694 filed July 21, 1975, now abandoned which in turn was a continuation-in-part application of copending application Ser. No. 403,787 Shaw, filed Oct. 5, 1973 and now abandoned, all of which are assigned to the same assignee as the present invention.

This invention related to a process of stabilizing a dielectric liquid impregnant and impregnating electrical devices therewith, and more particularly, to an improved method of stabilizing an aromatic ester impregnant with an antioxidant and impregnating an electrical capacitor therewith to provide residual antioxidant in the final capacitor.

A number of impregnants from the class of materials known as esters have been disclosed as capacitor impregnants. In U.S. Pat. Nos. 3,754,173, Eustance, 3,833,978, Eustance, and copending application Ser. No. 369,204 Eustance, all of which are assigned to the same assignee as the present invention, a phthalate ester modified with the addition of a small amount of epoxide, is disclosed as an effective and stabilized capacitor impregnant. However, it has been found that the use of an epoxide, as with the use of so many stabilizers, is effective for many but not all of the factors which cause capacitor failure. For example, in the use of the above combination it was found that a particular deficiency of some aromatic esters as capacitor impregnants is their susceptibility to thermal degradation, specifically oxidation at elevated temperatures. This phenomenon occurs to some extent, in spite of the fact that an epoxide has been added to the ester, the capacitor is vacuum sealed and the aromatic esters are ordinarily resistant to oxidation because of their chemical bonds. For example, a branch chain aromatic ester such as a phthalate ester is much more resistant to oxidation than castor oil, an aliphatic ester.

It has now been discovered that certain capacitor compatible antioxidants may be used to effectively stabilize prior epoxide stabilized liquid aromatic ester as capacitor impregnants. More particularly, certain classes of materials such as the naphthylamines, quinolines, quinones, and the mono and poly phenols, can be used to effectively stabilize liquid aromatic esters against thermal degradation in a capacitor or electrical environment. These stabilized esters, particularly the aromatic esters, provide a capacitor with effective resistance to oxidation at elevated temperatures. However, the stabilization must be continually effective in the impregnant, particularly during its purification and handling where high temperatures and exposure to oxygen are involved.

It is another object of this invention to provide an improved capacitor impregnation process for an epoxide and antioxidant stabilized dielectric liquid impregnant for polypropylene film electrical capacitors subjected to high alternating current voltage stress conditions.

It is further an object of this invention to provide an improved method of stabilizing a di (2-ethylhexyl) phthalate impregnant (DOP) for polypropylene film alternating current capacitors with antioxidants and epoxides.

SUMMARY OF THE INVENTION

A preferred form of this invention comprises the addition of a combination of sufficient amounts of an antioxidant and an epoxide to a liquid aromatic organic ester so that the ester can subsequently be purified, stored and used to impregnate a capacitor with resulting significant quantities of the antioxidant and epoxide remaining in the ester in the final capacitor.

BRIEF DESCRIPTION OF THE DRAWINGS

FIG. 1 is an exemplary capacitor roll section utilizing paper as the dielectric.

FIG. 2 is a complete capacitor in the form of a sealed can containing the roll section of FIG. 1.

FIG. 3 is a cross-section view of a part of a capacitor roll section utilizing synthetic resin film as the dielectric.

FIG. 4 is a view of a part of a capacitor roll section utilizing mixed synthetic resin film and paper as the dielectric.

FIG. 5 is a cross-section view of a part of a capacitor roll section utilizing a synthetic resin film in a different dielectric arrangement in a capacitor.

FIG. 6 is greatly reduced drawing of exemplary power capacitor utilizing multiple rolls and common to the large size power factor correction, induction heating and high frequency capacitor applications.

DESCRIPTION OF THE PREFERRED EMBODIMENTS

Typically, a preferred capacitor embodiment of this invention includes one or more capacitor roll sections which are rather tightly contained in a close fitting can or casing filled with a liquid impregnant and vacuum sealed. The capacitor roll section comprises alternate strips of dielectric material and electrode material which may be assembled in various arrangements.

Referring now to FIG. 1, there is disclosed an exemplary capacitor roll section 10 including a pair of electrode foils 11 and 12 and dielectric paper strips 13 and 14. The electrode foils may also be formed as metallized coatings on the paper strips 13 and 14 or on separate and additional dielectric strips of various materials. Suitable electrical connectors or tabs 15 and 16 are utilized to connect the electrode foils to capacitor terminals. The roll section 10 is placed in the can 17 of FIG. 2 and the can is filled under vacuum with a liquid impregnant and sealed. Connectors 18 and 19 of the can connect to tabs 15 and 16 of the roll section 10 for electrical connection purposes. Each dielectric paper strip 13 and 14 may be replaced with multiple paper strips in order to have a thicker dielectric or to take the electrical advantage of multiple sheets. Each strip 13 and 14 may also be replaced with one or more synthetic resin strips 20 and 21, as shown in FIG. 3 or with a mixed dielectric of a paper strip 13 and a resin strip 20, as shown in FIG. 4 and 5. Additional typical constructions and embodiments are shown in U.S. Pat. No. 3,363,156, Cox.

In these typical embodiments the dielectric liquid impregnant is caused to penetrate, permeate and fill essentially all of the gaps, voids and spaces found in and between the dielectric strips 13 and 14. This kind of impregnation as described in the aforementioned patent, is necessary for many capacitors to reduce the occurrence of deleterious corona discharge, in AC capacitors for example, at their application voltage, and to prevent arcing. The impregnant, by being in the electrical field between the electrodes, is subjected to high electrical stresses, some corona discharge, elevated and fluctuating temperatures, and other deleterious environmental conditions.

It has been discovered that the addition of certain capacitor compatible antioxidants to epoxide stabilized aromatic liquids in an alternating current capacitor under high stress conditions contributed to the stabilization of the capacitor against thermal degradation and other injurious factors which tend to increase with life. In addition to the stabilized function of an antioxidant in this invention, the antioxidant must be relatively pure and generally inert with respect to other materials in the capacitor environment, be effective in small amounts over the long life of the capacitor and not adversely affect the electrical characteristics of the capacitor. This is particularly important in AC highly stressed capacitors. Among the antioxidants which are most preferred for this invention are the hindered phenols, quinones and substituted quinones which have been found to be capacitor compatible with the specific capacitor environment described. Aromatic dielectric liquids for the purposes of this invention are those produced from an aromatic acid and an aromatic alcohol. However, in the case of some esters, the acid is aromatic but the alcohol is aliphatic. The end product is denoted an aromatic for the purposes of this invention. The same is true for an ester of an alphatic acid and an aromatic alcohol. The aromatic content is quite significant and has a significant effect on impregnant characteristics. Where both constituents are aliphatic the result is an aliphatic rather than aromatic. Of the esters, the aliphatics as well as those esters of a riconoleic acid are excluded.

A preferred ester is a branch chain aromatic ester, for example, a derivative of phthalic acid. For the purpose of this invention, one example of a preferred ester is the reaction product of phthalic acid and 2-ethylhexyl alcohol, known as di (2-ethylhexyl) phthalate or dioctyl phthalate (DOP). As hereinafter employed in this application, the term DOP refers interchangeably to di (2-ethylhexyl) phthalate.

The addition of the antioxidant may be made to unmodified DOP, i.e., DOP which contains no other capacitor stabilization additives, or to DOP which has been modified with the addition thereto of an epoxide. It is preferred to use the antioxidant additive of this invention with an epoxide modified DOP. However, tests show that the antioxidants are effective in DOP without the presence of an epoxide. DOP by its chemical nature is not nearly as susceptible to oxidation as other esters and an antioxidant was not believed to be necessary or desirable. Appropriate tests show dramatic effects as noted in the following examples.

In these examples, the DOP was purified by a column filtering process utilizing alumina or fullers earth as the filtering material so that is is essentially free of foreign impurities and particularly water. The ester impregnant is usually purchased in bulk form and requires a high degree of purification before it can be used in a capacitor. The epoxide and antioxidant should both be added to the ester prior to the purifying process, and the amounts added be sufficient to make up any losses and utilization which may occur in the interim period of purification and impregnation until the capacitor is finally sealed. For example, the column refining materials may remove significant quantities of epoxide and some antioxidant from the impregnant so that the final capacitor has less than the desired amounts therein. Also, the impregnation process may be a flood fill type where the impregnant is exposed to elevated temperatures in air with consequent oxidation, and further, the impregnated capacitor may be exposed to air while in a heated condition and before sealing so that oxidation can occur in this part of the process. Simple experimentation will lead to an adjustment of values indicating that the ester in the final capacitor contains at least between about 0.01 and 1.0% by weight of an antioxidant, and between about 0.1 and 10% by weight of an epoxide. In one practice, preferred amounts in the final capacitor are between about 0.1% by weight of both the antioxidant and the epxoide.

For electrical capacitor applications of the kind described it is much more important that the antioxidant be added in the above process than to be in the sealed capacitor. The capacitor is usually vacuum impregnated and almost completely filled so that there is little oxygen exposure. Nevertheless it is desirable to have some small quantity remain in the sealed capacitor.

The capacitor impregnation processes relate generally to that described in the noted U.S. Pat. No. 3,363,156, Cox, including drying the capacitors by subjecting them to elevated temperatures, which may be from 75° to above about 125° C. for several hours. During this cycle, capacitors were under vacuum conditions of less than about 200 u nercury. After impregnation with DOP, which was at about 70° to 80° C., the capacitors are sealed and then heat soaked at about 100° C. for many hours, e.g., 4 to 16 hours. In the heat soak time, the lag for the temperature in the capacitor to reach the desired level and the cooling down to room temperature is not included. The times given are the times at temperature.

In the following examples, a comparison is made between DOP unmodified, and DOP modified with an antioxidant, and an epoxide.

EXAMPLE I

Various DOP-antioxidant combinations were placed in a Balsbaugh type cell which comprises an insulated cell or container having spaced concentric cylindrical electrodes therein. The Balsaugh cell is a well-known and used cell for this purpose. A more complete description is given in ASTM Standards, Electrical Insulating Materials, 1970, ASTM D924, page 483. The chapter therein is entitled, "Standard Method of Test for Power Factor and Dielectric Constant of Electrical Insulating Liquids."

The cell was filled with unmodified but purified DOP liquid between electrodes and measurements were taken with the cell at 100° C.

The rate of change of dissipation factor as measured indicates the degradation rate of DOP. For unmodified DOP the dissipation factor was noted to increase from an initial reading of about 0.35% to about 0.575% over a period of 80 hours at 100° C. This shows that DOP exhibits a thermal instability at high temperatures. Such degradation could be expected in capacitors operating at a lower overall temperature because of localized hot spots and areas of high stress.

EXAMPLE II

The above experiment was repeated except that the DOP included about 1.0% of a hindered phenol antioxidant described as 2,6-di-tert butyl-p-cresol (Butylated hydroxytoulene) dissolved therein. This antioxidant is commercially available under the tradename Ionol from the Shell Chemical Company. Surprisingly, under the same conditions as EXAMPLE I, the dissipation factor decreased slightly from an initial value of about 0.4 to about 0.35% in 80 hours at 100° C.

EXAMPLE III

The above EXAMPLE I was repeated except that about 1.9% of epoxide (digylcidyl ether of bisphenol A, e.g., Dow epoxide 330), was added to unmodified but purified DOP. The dissipation factor was noted to rise from an initial value of about 0.28 to about 0.75% after about 80 hours at 100° C. indicating that epoxide alone did not significantly stabilize the dissipation factor. Thereafter this example was repeated with the addition of 1.0% Ionol antioxidant to the DOP/epoxide. The dissipation factor after 80 hours at 100° C. proved to be essentially constant at about 0.375%.

EXAMPLE IV

The acid number of esters have also been found to increase with thermal aging. Preferably an acid number for a capacitor impregnant should be below about 0.1 maximum. In the case of DOP it has been found that the acid number is stabilized by the addition of antioxidants. The following table is illustrative.

TABLE I

| Impregnant | Initial Acid # (mgs. KOH/ gm of ester) | Acid # After 16 Hrs. at 100° C |
|---|---|---|
| DOP | .007 | .026 |
| DOP + 1% Ionol | .007 | .009 |
| DOP + epoxide | .006 | .041 |
| DOP + epoxide + 1% Ionol | .006 | .006 |
| | | Acid # After 16 to 20 Hrs. at 150° C |
| Di-tert-butylhydroquinone | .007 | .044 |
| p-benzoquinone | .007 | .084 |
| Hydroquinone | .007 | .024 |
| 4-4-thiobis-(3-methyl-6-tert-butylphenol) | .007 | .020 |
| 1,2-dihydro-2-2-4-trimethyl-quinoline | .007 | .021 |
| 2-6-di-tert-butyl-4-hydroxymethyl phenol | .005 | .008 |
| 2-6-di-tert-butyl-p-cresol (butylated hydroxytoluene) | .005 | .009 |
| phenyl-alpha-naphthylamine | .006 | .011 |
| dilauryl thiodipropionate | .006 | .008 |
| N,N$^1$-disalicylidine | .006 | .138 |

In other tests the acid numbers of other esters were compared as follows.

TABLE II

| Inpregnant | Acid # After 20 Hrs. at 150° C |
|---|---|
| Di Tridecyl Phthalate (DTDP) | 0.55 |
| DTDP + 1% Epoxide | 0.23 |
| DTDP + 1% Epoxide + 1% Ionol | 0.02 |
| Dibutyl Phthalate (DBP) | 2.02 |
| DBP + 1% Epoxide | 1.79 |
| DBP + 1% Epoxide + 1% Ionol | .03 |
| Tri Cresyl Phosphate (TCP) | 0.1 |
| TCP + 1% Epoxide | 0.2 |
| TCP + 1% Epoxide + 1% Ionol | .04 |
| Di Isooctyl Phthalate (DIOP) | 1.12 |
| DIOP + 1% Epoxide | 0.25 |
| DIOP + 1% Epoxide + 1% Ionol | 0.02 |

EXAMPLE V

Several capacitors were assembled in the practice of this invention. Particularly these capacitors were similar to those of FIGS. 1 and 2. One group of capacitors utilized two sheets of paper for the dielectric 13. These paper sheets were 0.5 mil thick and 1.75 inches wide and the final capacitor is known as a ballast capacitor. The same capacitor was produced where the dielectric 13 was a single sheet of 0.32 mil polypropylene. Capacitors of both groups were tested with DOP, DOP with an epoxide, and DOP with an epoxide and an antioxidant, with satisfactory results.

It has been indicated in this invention that the aromatic ester liquid impregnants which are already epoxy stabilized are susceptible to oxidation and/or hydrolysis which causes both their acid numbers and percent dissipation factors to increase with time at elevated temperatures, particularly at about 100° C. and above. This degradation (oxidation, hydrolysis) can be induced thermally or through electric discharges. An antioxidant is added primarily to offset the chemical effects of oxidation, and significant stabilization is evidenced by its use.

Included among the antioxidants usable in the present invention are di-tert-butylhydroquinone, p-benzoquinone, hydroquinone, 4-4-thiobis-(3-methyl-6-tert-butylphenol), 1,2-dihydro-2-2-4-trimethylquinoline, 2-6-di-tert-butyl-4-hydroxymethyl phenol, 2-6-di-tert-butyl-p-cresol (butylated hydroxytoluene), phenylalpha-naphthylamine, dilaruryl thiodipropionate, N,N$^1$-disalicylidene, p-octylphenyl salicylate. Preferably the antioxidant is chosen from the class consisting of the hindered phenols, and the quinones and substituted quinones.

Tests indicate that the particular kind of antioxidant is not critical. Various antioxidants or mixtures of antioxidants may be used so long as effective amounts are added. An effective amount is primarily related to molecular weight, reaction rate, and solubility in the impregnant. In general, amounts between about 0.01% by weight up to about 10% by weight are satisfactory. However, a more preferred range is from about 0.1 to about 5.0%. The phenol antioxidants by reason of their chemical structure. Their reaction time and effect are most favorable to DOP in the capacitor environment. The amount of antioxidant to be added to any given impregnant is a function of reaction and reaction time as given generally in the foregoing examples.

It is a preferred practice to keep the amount added of an antioxidant well below the foregoing 10% by weight amount and specifically in the 0.01 to 1.0% range. Some antioxidants are more or less soluble in some esters, but solubility is not the important criteria for the amount being added. For example, a saturated solution of a highly soluble antioxidant may require an inordinately great amount of antioxidant with deleterious effects on electrical characteristics. A saturated solution is unnecessary in this invention and should be avoided. The range of additives given is substantially less than that required to provide a saturated solution. For example, some antioxidants of this invention have solubility in excess of 20 to 50% by weight. Of those antioxidants described, the ranges claimed in the claims of this invention are of amounts substantially less than those providing a saturated solution.

The antioxidant of this invention must be capacitor compatible which means that it should be effective in the operating environment of a capacitor. This environment usually includes elevated temperature operation in the presence of one or more of paper, iron, copper, tin, aluminum, and the usual impurities therein. Furthermore, the environment also includes the ester impregnant and its constituents at elevated temperatures as well as polypropylene film and its constituents in the presence of the ester impregnant. The polypropylene film is a rather recent dielectric for impregnated capacitors and its effects therein are not nearly so clearly established as those of paper.

Some antioxidants are effective in different capacitors in different degrees if not by indirect mechanisms or conditions. For example, some quinones may be less effective as antioxidants than others and their characteristics may differ particularly in the range of materials of the same class such as for example butylhydroquinone and dichloranthraquinone and betachloranthraquinone.

The impregnant of this invention has been found to be compatible in paper dielectric capacitors, capacitors with polypropylene film mixed with paper, and capacitors with polypropylene film dielectrics alone. An example of a mixed dielectric system is shown in the FIG. 4 arrangement wherein a sheet of paper 13 is adjacent one electrode foil 12 and a sheet of polypropylene 20 is adjacent the other electrode 11. It can be seen that other mixed dielectrics as in FIG. 5 can include two sheets of film 20 and 21 with an intermediate sheet of paper 13, or conversely two sheets of paper and an intermediate sheet of film.

The polypropylene film as described in the aforementioned U.S. Pat. No. 3,363,156, Cox, i.e., a stereo regular crystalline, biaxially oriented film, is also preferred. By crystalline, it is meant that the material has a significant crystalline content and the crystallinity dominates the physical characteristics of the material. The impregnant of this invention is not limited to the dielectrics noted and other members of the polyolefin group as well as other synthetic resins as the polycarbonates, polysulfones, and polyesters are usable dielectrics. It is known that some polyolefin films contain an antioxidant therein as a result of the process of manufacture of the film. In the present invention the liquid impregnant is stabilized quite apart from the capacitor environment and the distribution of the antioxidant is predetermined to be uniform. In the capacitor, the impregnant supplements the antioxidant in the film, if a film dielectric is involved and if the film contains an antioxidant.

The antioxidant-epoxide stabilized impregnant of this invention is an improved impregnant for those alternating current capacitors subjected to high voltage stress and high temperature conditions. Notably, a high voltage stress condition on the dielectric, when the dielectric is a synthetic resin film such as polypropylene, is from about 750 volts AC per mil thickness of the polypropylene to in excess of 1200 volts AC per mil, with the more critical part of the high stress range commencing at about 900 volts per mil. One example of such a capacitor is shown in FIG. 6.

FIG. 6 represents a high voltage power factor correction kind of capacitor wherein a low power factor is essential to its acceptability. In FIG. 6, capacitor 22 comprises a large can or casing 23, for example of 0.8 cu.ft. volume, in which a large number (10 to 40) of elongated roll sections 10 are used. These roll sections 10 may be from 10 to 25 inches in length. To be effective, the stabilized impregnant must be permeated throughout each roll section 10 because failure in but one section will cause failure of the entire capacitor.

Those capacitor factors which greatly influence and are most benefited by the stabilizers of this invention include alternating current capacitors which have highly stressed dielectrics and which are high dielectric constant materials. In this latter connection the aromatic sulfones, particularly the diaryl sulfones, are very high dielectric constant materials which are used as blenders with other fluids to provide a mixture having a higher dielectric constant than the host fluid. These diaryl sulfones are found to require the same impregnation process as described herein whether the host fluid be an ester of other fluid. The high dielectric constant sulfones contribute to the oxidation susceptibility of a base liquid. U.S. Pat. No. 3,370,013 describes diaryl sulfones. The purification process is carried out on the blend rather than on individual liquids.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. The process of impregnating a capacitor with an aromatic dielectric liquid comprising
   a. mixing with said liquid an antioxidant in an amount of greater than about 0.01% and up to about 10.0% by weight of said liquid.
   b. refining the mixture including passing the mixture through a filtering process to remove impurities but to retain some antioxidant therein.
   c. heating said mixture to an elevated temperature.
   d. vacuum impregnating a capacitor with said mixture.
   e. and sealing said capacitor with said capacitor retaining therein from between about 0.01 to 5.0% of said antioxidant by weight of said liquid.

2. The process of claim 1 wherein said liquid includes a diaryl sulfone.

3. The process of claim 2 wherein an epoxide in an amount greater than about 0.01% up to about 10.0% by weight is added to said liquid prior to said refining and between about 0.01 and 5.0% by weight of said epoxide remains in said capacitor.

4. The process of claim 3 wherein said liquid is a branch chain phthalate ester and said temperature is above about 70° C.

5. The process as recited in claim 4 wherein said antioxidant is taken from the class of hindered phenols and quinones.

6. The process of claim 5 wherein the mixture in the said mixing, refining, heating and vacuum impregnation steps is maintained under vacuum conditions.

* * * * *